United States Patent
Tamari et al.

[11] Patent Number: 5,851,582
[45] Date of Patent: Dec. 22, 1998

[54] MAGNETIC RECORDING MEDIUM AND PROCESS FOR PRODUCING THE SAME

[75] Inventors: Kousaku Tamari, Hiroshima; Takanori Doi, Hatsukaichi, both of Japan

[73] Assignee: Toda Kogyo Corporation, Japan

[21] Appl. No.: 725,820

[22] Filed: Oct. 7, 1996

Related U.S. Application Data

[62] Division of Ser. No. 403,368, Mar. 15, 1995, Pat. No. 5,601,904.

[30] Foreign Application Priority Data

Mar. 16, 1994 [JP] Japan .................................. 6-72663

[51] Int. Cl.$^6$ ........................................................ G11B 5/84
[52] U.S. Cl. ............................................. 427/130; 427/131
[58] Field of Search ....................................... 427/130, 131

[56] References Cited

U.S. PATENT DOCUMENTS 4,797,330  1/1989  Nasu et al. ............................... 428/694
5,496,631  3/1996  Tamari ..................................... 428/332

FOREIGN PATENT DOCUMENTS 0 461 834 A2  12/1991  European Pat. Off. .
0 586 142 A1   3/1994  European Pat. Off. .

*Primary Examiner*—Stevan A. Resan
*Attorney, Agent, or Firm*—Nixon & Vanderhye

[57] ABSTRACT

The disclosure describes a magnetic recording medium comprising:

a substrate;

an NiO primary layer which is formed on the substrate and in which the plane (200) is substantially oriented in parallel with the surface of the substrate; and a Co-containing maghemite thin film which is formed on the NiO primary layer and in which the plane (400) is substantially oriented in parallel with the surface of the substrate, the molar ratio of Co to Fe is not less than 0.01 to less than 0.10, and the spacing of the plane (400) is not more than 2.082 Å.

2 Claims, No Drawings

MAGNETIC RECORDING MEDIUM AND PROCESS FOR PRODUCING THE SAME

This application is a divisional of Ser. No. 08/403,368 filed Mar. 15, 1995, now U.S. Pat. No. 5,601,904.

BACKGROUND OF THE INVENTION

The present invention relates to a magnetic recording medium and a process for producing the same, and more particularly, to a magnetic recording medium composed of a perpendicular magnetic film which has an excellent oxidation resistance, an excellent corrosion resistance, an appropriate coercive force for preventing a magnetic saturation of a magnetic head which is widely used at present, particularly, a coercive force of less than 3000 Oe and a large squareness (value compensated by a demagnetization coefficient) and hence, which is suitable as a high-density magnetic recording medium, and a process for producing the magnetic recording medium.

With recent remarkable tendency for downsizing and higher reliability of information processing apparatuses and systems, magnetic recording media have increasingly been required to have a higher recording density. Perpendicular magnetic films as magnetic recording media which respond to such demand have been rapidly developed and put to practical use. Perpendicular magnetic films which are magnetized perpendicularly to the film plane are not only free from demagnetization but also capable of high-density recording.

An alloy film such as a CoCr alloy film has conventionally been proposed as a perpendicular magnetic film. However, it is necessary to coat the surface of a CoCr alloy film with a carbon film having a thickness of about 100 to 200 Å in order to prevent the deterioration of the magnetization characteristics. As a result, the spacing loss caused by the distance between a magnetic head and the recording layer is increased by the distance corresponding to the thickness of the carbon film, which is unsuitable for high-density recording. For this reason, a material of a perpendicular magnetic film is strongly required to be an oxide which is stable against oxidation.

As to the coercive force of a perpendicular magnetic film, an appropriate coercive force for preventing a magnetic saturation of a magnetic head which is widely used at present, particularly, a coercive force of less than 3000 Oe is required.

The coercive force Hc of a magnetic recording medium has a close relationship with the performance of a magnetic head, as is well known. When the coercive force Hc of the magnetic recording medium is as high as more than 3000 Oe, the current at which a writing operation is performed becomes so high that the head core of a magnetic head which is widely used at present, is magnetically saturated due to an insufficient saturation flux density Bm. As a result, it is impossible to sufficiently magnetize the magnetic recording medium.

A ferrite head is widely used in a magnetic recording and reproducing system which corresponds to a magnetic recording medium having a coercive force of not more than 1000 Oe, while a head such as a Sendust head, an amorphous head and a thin-film head, whose head core is made of a material having a high saturation flux density, is used in a magnetic recording and reproducing system which corresponds to a magnetic recording medium having a coercive force of more than 1000 Oe.

In addition, a magnetic recording medium is required to have as large a reproduction output as possible. For this reason, a perpendicular magnetic film is required to have as large a squareness as possible.

As a perpendicular magnetic film for magnetic recording, an alloy film such as a CoCr alloy film and a CoPt alloy film, a spinel oxide thin film such as a cobalt ferrite film (Japanese Patent Application Laid-Open (KOKAI) Nos. 51-119999 (1976), 63-47359 (1988), 3-17813 (1991), 3-188604 (1991), 4-10509 (1992), and 5-12765 (1993)), a magneto-plumbite oxide thin film such as a barium ferrite film (Japanese Patent Application Laid-Open (KOKAI) No. 62-267949 (1987)) and the like have conventionally been proposed.

Among the above-described perpendicular magnetic films, the cobalt ferrite ($Co_xFe_{3-x}O_4$) films which are typical of spinel oxides are stable against oxidation, because the cobalt ferrite ($Co_xFe_{3-x}O_4$) films are oxides, and have a large crystalline magnetic anisotropy. Owing to these magnetic characteristics the cobalt ferrite films are considered to be promising as a perpendicular magnetic recording medium.

As the process for producing a cobalt ferrite ($Co_xFe_{3-x}O_4$) film, various methods such as sputtering method, vacuum evaporation method and MO-CVD method are known.

In order to improve the orientation of a perpendicular magnetic film, various attempts have recently been made. For example, a single crystal material is used as a substrate, and various types of primary layers are formed between a perpendicular magnetic film and a substrate. There are known a perpendicular magnetic film using a MgO single crystal as a substrate (IEEE Trans. Mag. MAG-12, No. 6,733 (1976), IEEE Trans. Mag. MAG-14, No. 5,906 (1978) and Czehch. J. Phys. B21, 563 (1971)), a perpendicular magnetic film using NaCl layer as a substrate (J. Cry. Growth; 50, 801 (1980)), a perpendicular magnetic film using NiO layer as an primary film (Japanese Patent Application Laid-Open (KOKAI) No. 5-166167 (1993)), etc.

Although a perpendicular magnetic film which has an excellent oxidation resistance, an excellent corrosion resistance, and an appropriate coercive force for preventing a magnetic saturation of a head which is widely used at present, is now in the strongest demand, none of the conventional magnetic thin films sufficiently meet these requirements.

For example, a cobalt ferrite ($Co_xFe_{3-x}O_4$) film produced by a sputtering method is disadvantageous in that although the easy magnetization axis of a cobalt ferrite ($Co_xFe_{3-x}O_4$) film is an axis (100), the axis (100) thereof is likely to orient at random or the plane (111) is likely to orient in parallel with the surface of the substrate, so that it is difficult to produce a perpendicular magnetic film. (1) The method described in *Proceedings of the 9-th Meeting of Magnetic Society of Japan* 29PB-10, (2) the method described in *Proceeding of the 13-th Meeting Magnetic Society of Japan,* p 246, and (3) the method described in Japanese Patent Application Laid-Open (KOKAI) No. 4-10509 (1992) are known as examples of a method for obtaining a cobalt ferrite ($Co_xFe_{3-x}O_4$) film in which the plane (400) is predominantly oriented in parallel with the surface of the substrate.

The method (1) is a method of depositing Fe and Co ionized in an oxygen plasma on an $MgAl_2O_4$ substrate or a silica glass substrate heated to 500° C. Since it is necessary to maintain the substrate temperature at a high temperature such as not lower than 500° C. during film formation, the productivity is poor. In addition, in order to raise the substrate temperature to not lower than 500° C., the substrate itself is required to hare a high heat resistance. However, the heat resistance of glass or the like, which is widely used as a material of the substrate for a perpendicular magnetic recording medium, is insufficient. In this way, since the material of the substrate is limited, it is not advantageous either industrially or economically.

The method (2) is a plasma-exciting MO-CVD method. Since it is necessary to maintain the substrate temperature at 300° to 400° C. in a vacuum during film formation, the productivity is poor, which is industrially and economically disadvantageous.

The method (3) is a method of annealing a multilayered metal film produced by laminating at least two layers of Co and Fe at a temperature of not lower than 500° C. in an atmosphere containing oxygen. Since a high temperature is necessary, the material of the substrate is limited, as described above, which is disadvantageous industrially and economically.

If an MgO single crystal layer or NaCl layer is used as a primary film as in the known technique, it is easy to form a ferrite film as a perpendicular film in which the plane (400) is substantially oriented in parallel with the surface of the substrate, but since the MgO single crystal layer is expensive, the MgO single crystal layer and NaCl layer are easily broken and it is difficult to obtain the MgO single crystal layer or NaCl layer having a large area, use of such the MgO single crystal layer or NaCl layer as a substrate is not practical.

Since an NiO film as a primary film in which the plane (200) is substantially oriented in parallel with the surface of the substrate can be easily produced on a glass substrate by sputtering at room temperature, it is practical to use the film as a primary film. However, the perpendicular magnetic film described in Japanese Patent Application Laid-Open (KOKAI) No. 5-166167 (1992) arises the problem that although the crystal orientation of the plane (400) is accelerated by forming Cc ferrite on the NiO primary film. As seen from Japanese Patent Application Laid-Open (KOKAI) No. 3-17813(1991), when the lattice constant of a primary film is larger than that of a ferrite film, the perpendicular anisotropy of the ferrite film becomes larger. But when a Co-ferrite film is disposed on an NiO primary film, the lattice constant of the primary film is smaller than that of the Co-ferrite film. Namely, since the spacing (2.09 Å) of the plane (200) of the NiO primary film is smaller than the spacing. (2.10 Å) of the plane (400) of $Co_xFe_{3-x}O_4$, the perpendicular anisotropy is reduced due to the compressive stress in the plane direction of the Co-ferrite film.

European Patent No. 0 586 142 Al discloses a perpendicular magnetic film comprising: a primary layer of an NiO film formed on a substrate, in which the plane (100) is predominantly oriented in parallel with the substrate; and a Co-containing $\gamma$-$Fe_2O_3$ film formed on the primary layer, in which the plane (400) is predominantly oriented in parallel with the substrate, the molar ratio of Co to Fe is from 0.10:1 to 0.32:1, the spacing of the plane (400) is not more than 2.084 Å, and the optical absorption coefficient at 700 nm is not more than 2.5 $\mu m^{-1}$.

The perpendicular magnetic film disclosed in European Patent No. 0 586 142 Al has a coercive force of not less than 4000 Oe, and the technical problem thereof is to provide a perpendicular magnetic film which has an excellent oxidation resistance, an excellent corrosion resistance, a large coercive force, e.g., a coercive force of not less than 4000 Oe, a large squareness, a large Faraday rotation angle in a short-wavelength region, and a small optical absorption coefficient.

The technical problem to be solved by the present invention is to produce a perpendicular magnetic film which has an excellent oxidation resistance, an excellent corrosion resistance, an appropriate coercive force, for example, a coercive force of less than 3000 Oe (in which the technical developing direction is just in the opposite direction to that of European Patent No. 0 586 142 Al), at a temperature which is lower than 500° C. and as low as possible, under the industrially and economically favorable conditions.

As a result of studies undertaken by the present inventor so as to solve the technical problem, it has been found that by forming, on the surface of a substrate, an NiO primary layer in which the plane (200) is predominantly (substantially) oriented in parallel with the surface of the substrate; forming a monolayered Co-containing magnetite film or a multilayered film composed of at least one unit on the NiO primary layer, one unit being a laminate of a magnetite layer and a CoO layer, in which the plane (400) is predominantly (substantially) oriented in parallel with the surface of the substrate and the molar ratio of Co to Fe is not less than 0.01 and less than 0.10; and annealing the monolayered film or multilayered film at 240° to 450° C., the thus obtained perpendicular magnetic film has a coercive force of less than 3000 Oe, a large squareness (value compensated by a demagnetization coefficient) such as not less than 0.88, an excellent oxidation resistance and an excellent corrosion resistance. On the basis of this finding, the present invention has been achieved.

SUMMARY OF THE INVENTION

It is an object of the present invention to eliminate the above-described problems in the related art and to provide a magnetic recording medium composed of a perpendicular magnetic film which has an excellent oxidation resistance, an excellent corrosion resistance, and an appropriate coercive force (e.g., less than 3000 Oe) for preventing a magnetic saturation of a magnetic head.

To achieve the aim, in a first aspect of the present invention, there is provided a magnetic recording medium comprising: a substrate; an NiO primary layer which is formed on the surface of the substrate and in which the plane (200) is substantially oriented in parallel with the surface of the substrate; and a Co-containing maghemite thin film which is formed on the NiO primary layer and in which the plane (400) is substantially oriented in parallel with the surface of the substrate, the molar ratio of Co to Fe is not less than 0.01 and less than 0.10, and the spacing of the plane (400) is not more than 2.082 Å.

In a second aspect of the present invention, there is provided a magnetic recording medium comprising: a substrate; an NiO primary layer which is formed on the surface of the substrate and in which the plane (200) is substantially oriented in parallel with the surface of the substrate; and a Co- and Mn-containing maghemite thin film which is formed on the NiO primary layer and in which the plane (400) is substantially oriented in parallel with the surface of the substrate, the molar ratio of Co to Fe is not less than 0.01 and less than 0.10, the molar ratio of Mn to Co is 0.07 to 0.30, and the spacing of the plane (400) is not more than 2.082 Å.

In a third aspect of the present invention, there is provided a process for producing a magnetic recording medium comprising the steps of: forming, on the surface of a substrate, an NiO primary layer in which the plane (200) is substantially oriented in parallel with the surface of the substrate; forming a monolayered Co-containing magnetite film or a multilayered film composed of at least one unit on the NiO primary layer, one unit being a laminate of a magnetite layer and a CoO layer, in which the plane (400) is substantially oriented in parallel with the surface of the substrate, and the molar ratio of Co to Fe is not less than 0.01 and less than 0.10; and annealing the monolayered film or multilayered film in a temperature range of 240° to 450° C.

In a fourth aspect of the present invention, there is provided a process for producing a magnetic recording medium comprising the steps of: forming, on the surface of a substrate, an NiO primary layer in which the plane (200) is substantially oriented in parallel with the surface of the substrate; forming a monolayered Co- and Mn-containing magnetite film or a multilayered film composed of at least one unit on the NiO primary layer, one unit being a laminate of a magnetite layer and an oxide layer containing Co and Mn, in which the plane (400) is substantially oriented in parallel with the surface of the substrate, the molar ratio of Co to Fe is not less than 0.01 and less than 0.10 and the molar ratio of Mn Lo Co is 0.07 to 0.30; and annealing the monolayered film or multilayered film in a temperature range of 240° to 450° C.

DETAILED DESCRIPTION OF THE INVENTION

A perpendicular magnetic film according to the present invention is a Co-containing maghemite thin film formed on a substrate via an NiO primary layer. The plane (400) of the thin film is substantially oriented in parallel with the surface of the substrate and the spacing of the plane (400) is not more than 2.082 Å. The molar ratio of Co to Fe in the thin film is not less than 0.01 and less than 0.10, preferably 0.015 to 0.075, more preferably 0.02 to 0.06 and the coercive force of the thin film is less than 3000 Oe.

Substantial orientation in the present invention is defined by the peak area ratio of each plane which is measured by an X-ray diffratometer. In the NiO primary layer, substantial orientation means that the ratio of the peak area ($S_{(200)}$) of the plane (200) to the peak area ($S_{(111)}$) of the plane (111) is not less than 2 [$S_{(200)}/S_{(111)} \geq 2$], and in the Co-containing $\gamma$-$Fe_2O_3$ layer, substantial orientation means that the ratio of the peak area ($S_{(400)}$) of the plane (400) to the peak area ($S_{(311)}$) of the plane (311) is not less than 2 [$S_{(400)}/S_{(311)} \geq 2$]. In the monolayered Co-containing magnetite film or multilayered film composed of at least one unit which is the laminate of the magnetite layer and CoO layer, substantial orientation means that the ratio of the peak area ($S_{(400)}$) of the plane (400) to the peak area ($S_{(311)}$) of the plane (311) is not less than 2 [$S_{(400)}/S_{(311)} \geq 2$], and in the monolayered Co- and Mn-containing magnetite film or multilayered film composed of at least one unit which is the laminate of the magnetite layer and oxide layer containing Co and Mn, substantial orientation means that the ratio of the peak area ($S_{(400)}$) of the plane (400) to the peak area ($S_{(311)}$) of the plane (311) is not less than 2 [$S_{(400)}/S_{(311)} \geq 2$].

In the present invention, the spacing of the plane (400) in the Co-containing maghemite thin film is not more than 2.082 Å, preferably 2.065 to 2.082 Å. The maghemite thin film of the present invention also includes a thin film in which $Fe^{2+}$ in the magnetite which constitutes the monolayered film or multilayered film is completely oxidized into $Fe^{3+}$, i.e., $\gamma$-$Fe_2O_3$, and a thin film in which a slight amount of $Fe^{2+}$ in the magnetite remains.

The more an oxygen partial pressure lowers at the formation of the monolayered film composed of Co-containing magnetite or the multilayered film comprising the magnetite layer and CoO layer, the spacing of the plane (400) in the Co-containing maghemite thin film tends to become smaller.

The terms of "Co-containing maghemite" and "Co-containing magnetite" in the present invention mean "maghemite containing Co compound" and "magnetite containing Co compound", respectively. The terms of "Co- and Mn-containing maghemite" and "Co- and Mn-containing magnetite" in the present invention mean "maghemite containing Co compound and Mn compound", and "magnetite containing Co compound and Mn compound", respectively.

When the plane (400) of a magnetization film is not substantially oriented in parallel with the surface of the substrate, or when the spacing of the plane (400) of a magnetization film exceeds 2.082 Å, the magnetization film may not constitute a perpendicular magnetic film. If the molar ratio of Co to Fe is less than 0.01, it is difficult to produce a perpendicular magnetic film. In order to facilitate the production of a Co-containing maghemite thin film in which the plane (400) is substantially oriented in parallel with the surface of the substrate, the molar ratio of Co to Fe is preferably not less than 0.02. If the molar ratio of Co to Fe is not less than 0.10, the coercive force exceeds 3000 Oe. If the spacing of the plane (400) is less than 2.065, the coercive force sometimes exceeds 3000 Oe.

The squareness (compensated by a demagnetization coefficient) of the perpendicular magnetic thin film according to the present invention is not less than 0.88, preferably not less than 0.92, more preferably not less than 0.94.

The perpendicular magnetic thin film according to the present invention includes a Co-containing maghemite thin film containing Mn. By incorporating Mn to the Co-containing maghemite thin film, it is possible to obtain a perpendicular magnetic film having excellent squareness (compensated by a demagnetization coefficient), especially a squareness of not less than 0.92, preferably not less than 0.95.

The Mn content is 0.07 to 0.30, preferably 0.10 to 0.20 based on the Co content in molar ratio. If the molar ratio of Mn to Co is less than 0.07, it is difficult to improve the squareness of the perpendicular magnetic film. With consideration for a preferable squareness, the upper limit of the molar ratio of Mn to Co is 0.30.

If the coercive force of a perpendicular magnetic film of the present invention is more than 3000 Oe, it is impossible to prevent a magnetic saturation of a magnetic head which is widely used at present. From the point of view of prevention of the magnetic saturation of a magnetic head, the coercive force is preferably not more than 2500 Oe.

A perpendicular magnetic film according to the present invention is obtained by annealing a monolayered Co-containing magnetite film or a multilayered film at 240° to 450° C. The multilayered film is composed of at least one unit formed on a substrate via an primary layer, one unit being a laminate of a magnetite [$FeO_x \bullet Fe_2O_3$ ($0<x \leq 1$)] layer and a CoO layer, wherein the plane (400) of the multilayered film is substantially oriented in parallel with the surface of the substrate, and the molar ratio of Co to Fe is not less than 0.01 and less than 0.10.

A perpendicular magnetic film of the present invention may contain Mn in the Co-containing maghemite thin film, if necessary. In producing such a perpendicular magnetic film, a multilayered film including oxide layer(s) containing Co and Mn in place of the CoO layer(s) is formed, and the multilayered film is annealed in the above-described way.

The multilayered film comprising magnetite [$FeO_x \bullet Fe_2O_3$ ($0<x \leq 1$)] layers and CoO layers or oxide layer containing Co and Mn in the present invention can be produced by any of a reactive sputtering method in which metal targets (Fe target plus Co target, or Co target and Mn target) are sputtered in an oxidizing atmosphere, a direct method in which an oxidized film is directly formed from a sintered target of magnetite [FeO$_x$•Fe$_2$O$_3$ (0<x≦1)] and a sintered target of an oxide which contains Co or Co and Mn, and a reactive evaporation method in which metals (metals or alloys composed of Fe and Co or of Fe, Co and Mn) are evaporated in an oxidizing atmosphere. In the reactive sputtering method, by elevating an oxygen partial pressure the multilayered film can be produced at a higher deposition rate.

In a multilayered film according to the present invention, the molar ratio of Co to Fe in the multilayered film is not less than 0.01 and less than 0.10. It is impossible to obtain a perpendicular magnetic film aimed at in the present invention by using a multilayered film in which the molar ratio of Co to Fe is less than 0.01 or not less than 0.10.

Since a multilayered film of the present invention is epitaxially grown on an NiO primary layer, it is possible to make the plane (400) to substantially orient in parallel with the surface of the substrate even if the thickness of one unit is not less than 130 Å, thereby reducing the number of times of lamination, which is advantageous from the point of view of industry and economy.

It has been confirmed by experiments that it is necessary to reduce the thickness of one unit to not more than 130 Å in order to produce a perpendicular magnetic film when there is disposed no NiO primary layer.

As seen from the above, the perpendicular magnetic film according to the present invention can be produced by
(i) a method of forming a multilayered film composed of at least one unit on a substrate via an NiO primary layers one unit being a laminate composed of the magnetite layer and CoO layer, the plane (400) of the multilayered film being substantially oriented in parallel with the surface of the substrate and the molar ratio of Co to Fe in the multilayered film being not less than 0.01 and less than 0.10, and annealing the obtained multilayered film at a temperature of 240° to 450° C.; or
(ii) a method of forming a monolayered Co-containing magnetite film on a substrate via an NiO primary layer, the plane (400) of the monolayered film being substantially oriented in parallel with the surface of the substrate and the molar ratio of Co to Fe in the monolayered film being not less than 0.01 and less than 0.10, and annealing the obtained monolayered film at a temperature of 240° to 450° C. The method of producing the perpendicular magnetic film from the multilayered film is preferred because each growth of magnetite and CoO is not suppressed each other and can be independently conducted, thereby making easily the plane (400) to substantially orient in parallel with the surface of the substrate.

In the multilayered film according to the present invention, one unit is a laminate obtained by epitaxially growing on the NiO primary layer the magnetite [FeO$_x$•Fe$_2$O$_3$ (0<x≦1)] layer and the CoO layer in order, or the CoO layer and the magnetite [FeO$_x$•Fe$_2$O$_3$ (0<x≦1)] layer in order. The thickness of one unit is not specified. For example, it has been confirmed that when the thickness of one unit is 1500 Å, the desired perpendicular magnetic film was produced.

Further, the number of units is not specified. The number of units is decided so as to produce a perpendicular magnetic film having a desired thickness since the thickness of the perpendicular magnetic film according to the present invention is 500 to 3000 Å. For example, in a perpendicular magnetic film having 1500 Å in thickness, when the thickness of one unit is 1500 Å, the number of unit is one, and also, when the thickness of one unit is 750 Å, the number of unit is two.

By the way, in European Patent No. 0 586 142 A1 discloses that when the annealing temperature is lower than 280° C., the transformation of Fe$_3$O$_4$ into γ-Fe$_2$O$_3$ or the diffusion of Co is insufficient, and when the thickness of on unit exceeds 800 Å, the diffusion of Co is insufficient.

On the other hand, since the molar ratio of Co to Fe in the multilayered film according to the present invention is low so that Co is easily diffused into γ-Fe$_2$O$_3$, even if the annealing temperature is lower than 280° C. and/or the thickness of one unit is more than 800 Å, the desired perpendicular magnetic film can be produced.

In the case of forming an oxide layer containing Co and Mn in the present invention, it can be produced by any of a reactive sputtering method in which a metal target (Co target and Mn target, Co-Mn alloy target, or Co and Mn composite target) is sputtered in an oxidizing atmosphere, a method in which an oxidized film is formed from a sintered target of an oxide containing Co and Mn, and a reactive evaporation method in which metals (metals or alloys composed of Co and Mn) are evaporated in an oxidizing atmosphere.

The annealing temperature of the monolayered film or multilayered film of the present invention is 240° to 450° C.

If the annealing temperature is lower than 240° C., the oxidation of the magnetite [FeO$_x$•Fe$_2$O$_3$ (0<x≦1)], i.e., the transformation of Fe$_3$O$_4$ into γ-Fe$_2$O$_3$ or the diffusion of Co and Mn in the maghemite thin film is insufficient for obtaining a perpendicular magnetic film of the present invention. If the annealing temperature exceeds 450° C., the transformation of γ-Fe$_2$O$_3$ into γ-Fe$_2$O$_3$ begins to be caused so that it is impossible to produce a perpendicular magnetic film aimed at in the present invention.

In annealing, the transformation temperature for oxidizing the magnetite [FeO$_x$•Fe$_2$O$_3$ (0<x≦1)], i.e., transforming Fe$_3$O$_4$ into γFe$_2$O$_3$ is lowered by adding Cu to the film, as described in, for example, Japanese Patent Application Laid-Open (KOKAI) No. 57-54309 (1982). It is possible to produce a similar effect by adopting this method in the present invention. Annealing may be carried out in two stages: the magnetite [FeO$_x$•Fe$_2$O$_3$ (0<x≦1)] is first oxidized (Fe$_3$O$_4$ is first transformed into γ-Fe$_2$O$_3$) at 200° to 320° C., and Co and Mn are then diffused at 240° to 450° C. In this case, it is possible to suppress the production of a crack which is likely to be caused during the oxidation of the magnetite (transformation of Fe$_3$O$_4$ into γ-Fe$_2$O$_3$).

The thickness of the NiO primary layer in the present invention is preferably 800 to 3000 Å, more preferably 1200 to 2400 Å.

The NiO primary layer can be produced by any of a reactive sputtering method in which a metal (Ni) target is sputtered in an oxidizing atmosphere, a method in which an oxidized film is formed from a sintered target of an oxide containing Ni, and a reactive evaporation method in which a metal (Ni) is evaporated in an oxidizing atmosphere, to a substrate maintained at a temperature of not more than 100° C., preferably a low temperature within the above-mentioned range. If the temperature exceeds 100° C., the plane (200) is unlikely oriented in parallel with the surface of the substrate.

As the material of the substrate in the present invention, generally used materials such as glass are usable.

What is the most important in the present invention is that the perpendicular magnetic film of the present invention is produced by annealing (i) a multilayered film composed of at least one unit and formed on a substrate via an NiO primary layer, one unit being a laminate of a magnetite [$FeO_x \cdot Fe_2O_3$ ($0<x\leq1$)] layer and a CoO layer, in which the plane (400) is substantially oriented in parallel with the surface of the substrate and the molar ration of Co to Fe is not less than 0.01 and less than 0.10, or (ii) a monolayered Co-containing magnetite film formed on a substrate via an NiO primary layer, the molar ration of Co to Fe is not less than 0.01 and less than 0.10, and that in the perpendicular magnetic film obtained in this manner, the plane (400) is substantially oriented in parallel with the surface of the substrate, the spacing of the plane (400) is not more than 2.082 Å and the coercive force is appropriate for preventing a magnetic saturation of a magnetic head which is widely used at present, particularly, less than 3000 Oe.

The perpendicular magnetic film of the present invention has a large perpendicular anisotropy, in spite of using an NiO primary layer. It is considered that this is because the spacing of the plane (400) of the Co-containing maghemite thin film, which is not more than 2.08 Å, is smaller than the spacing of the NiO primary layer, which is 2.09 Å.

The perpendicular magnetic film of the present invention has an appropriate coercive force, especially, a coercive force of less than 3000 Oe because it is formed on the NiO primary layer in which the plane (200) is substantially oriented in parallel with the surface of the substrate.

When the transformation of $Fe_3O_4$ into $\gamma$-$Fe_2O_3$ by annealing treatment at a temperature of 240° to 450° C. according to the present invention, the crystalline form therebetween is hardly changed. Namely the $Fe_3O_4$ crystal is a cubic spinel having a lattice constant of 8.3967 Å (refer to National Bureau of Standards Monograph 25, Soc. 5, 31, 1967) and the crystal $\gamma$-$Fe_2O_3$ is also cubic spinel having a lattice constant of 8.350 Å (refer to Haul and Shoon, Z. Phys. Chemie, 44, 216 26, 1939). In the cubic crystalline form, since the plane (400) is equivalent to each of plane (040) and plane (004), the peak of each plane is shown at the same position in X-ray diffraction spectrum. Accordingly, in the present invention, these planes are correctively defined as "plane (400)". Further, since the NiO crystal is a cubic crystalline form, the plane (200) is equivalent to each of plane (020) and plane (002), and the peak of each plane is shown at the same position in X-ray diffraction spectrum. Accordingly, in the present invention, these planes are correctively defined as "plane (200)".

That the small spacing of the perpendicular magnetic film of the present invention is caused not by the shrinkage or the like of the substrate but due to the film itself, has been confirmed from the fact that the spacing of the film produced by transforming a monolayer $Fe_3O_4$ film (2000 Å in thickness) in which the plane (222) is oriented in parallel with the same glass substrate as that of the perpendicular magnetic film of the present invention into a $\gamma$-$Fe_2O_3$ film was 2.407 Å, which is approximately the same as 2.408 Å of the bulk value.

Since a multilayered film of the present invention is formed on the NiO primary layer in which the plane (200) is substantially oriented in parallel with the surface of the substrate, it is possible to increase the thickness of one unit of the multilayered film. It is considered to be because the crystalline of the magnetite layer and the CoO layer or the oxide layer containing Co and Mn epitaxially grows on the primary layer.

With respect to the magnetic characteristics of a perpendicular magnetic film of the present invention, the coercive force is less than 3000 Oe, preferably 1000 to 2500 Oe; the saturation magnetization is not less than 280 emu/cm$^3$, preferably not less than 300 emu/cm$^3$, more preferably not less than 310 emu/cm$^3$; the squareness is not less than 0.33, preferably not less than 0.40; the squareness compensated by a demagnetization coefficient is not less than 0.88, preferably not less than 0.92, more preferably not less than 0.94; and the perpendicular anisotropic magnetic field is not less than 5000 Oe, preferably not less than 6000 Oe.

As described above, a perpendicular magnetic film according to the present invention has an excellent oxidation resistance and an excellent corrosion resistance because it is an oxide, and it has an appropriate coercive force, especially a coercive force of not less than 3000 Oe and a large squareness (value compensated by a demagnetization coefficient). A perpendicular magnetic film of the present invention is therefore suitable as a magnetic recording medium for high-density recording.

In addition, according to a process for producing a magnetic recording medium of the present invention, since it is possible to make the thickness of one unit of a multilayered film large, it is greatly advantageous from the point of view of industry and economy.

EXAMPLES

The present invention will be explained in more detail hereinafter with reference to the following examples and comparative examples.

In the following examples and comparative examples, the magnetic characteristics were measured by using "Vibrating Sample Magnetometer VSM-3S-15" (manufactured by Toei Kogyo Co., Ltd.).

The X-ray diffraction spectrum of a perpendicular magnetic thin film was measured by an X-ray diffraction apparatus RAD-2A (manufactured by Rigaku Denki Kogyo Co., Ltd.) under the conditions that lamp used: Fe, phase voltage: 40 kV, phase current: 20 mA, goniometer: wide angle goniometer, sampling width: 0.010°, scanning speed: 1.000°/min, divergence slit: 1°, scattering slit: 1°, light receiving slit: 0.30 mm, and diffraction angle ($2\theta$)): 40.00° to 60.00°.

In the X-ray diffraction spectrum of a perpendicular magnetic thin film of the present invention which is composed of an NiO primary layer and a Co-containing $\gamma$-$Fe_2O_3$ film, since the position of the peak of the plane (400) of Co-containing $\gamma$-$Fe_2O_3$ and the position of the peak of the plane (200) of NiO are very close, these two peaks overlap each other. In order to obtain the peak area of the plane (400) of Co-containing $\gamma$-$Fe_2O_3$, it is therefore necessary to subtract the peak area of the plane (200) of NiO from the peak area including the plane (400) of Co-containing $\gamma$-$Fe_2O_3$ and the plane (200) of NiO.

The peak area of the plane (200) of NiO was obtained by the following two methods, and approximately the same value was obtained by these methods.

Method 1

The peak area of the plane (200) of NiO was obtained by measuring the NiO film by X-ray diffractometry at the point of time when it was formed on the substrate.

Method 2

After the perpendicular magnetic thin film composed of an NiO primary layer and Co-containing $\gamma$-$Fe_2O_3$ layer was immersed in a concentrated hydrochloric acid at 80° C. for 30 seconds, it was taken out, washed with water and dried. Since NiO is difficult to solve in a concentrated hydrochloric acid as compared with Co-containing $\gamma$-$Fe_2O_3$, it is possible to remove only Co-containing $\gamma$-$Fe_2O_3$ by this treatment. The X-ray diffraction spectrum of the thus-obtained film was measured and the peak area of the plane (200) of NiO was obtained.

The spacing of the plane (400) of Co-containing $\gamma$-Fe$_2$O$_3$ layer was obtained by the following method. The X-ray diffraction spectrum of the NiO primary layer was first measured by the above-described method, and the X-ray diffraction spectrum of Co-containing $\gamma$-Fe$_2$O$_3$ layer was then obtained by removing the X-ray diffraction spectrum of the NiO primary layer from the X-ray diffraction spectrum of the perpendicular magnetic film of the present invention by computation using a processor (produced by RINT). The spacing of the plane (400) of Co-containing $\gamma$-Fe$_2$O$_3$ layer was obtained from the peak position of the plane (400) of the thus-obtained X-ray diffraction spectrum of Co-containing $\gamma$-Fe$_2$O$_3$ layer. It is possible to obtain the peak area of the plane (400) of Co-containing $\gamma$-Fe$_2$O$_3$ layer from the X-ray diffraction spectrum thereof obtained by this method.

EXAMPLE 1

In a high-frequency high-rate sputtering device SH-250H-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 5, and that the plane (200) was substantially oriented in parallel with the surface of the substrate.

Thereafter, a spinel Fe$_3$O$_4$ film having a thickness of 158 Å and an NaCl-type CoO film having a thickness of 2 Å (the molar ratio of Co to Fe was 0.02) were formed on the primary layer at 200° C. as one unit of a multilayered film. That is, the thickness of one unit was 160 Å. These operations were alternately repeated 24 times to obtain a laminated film composed of 12 Fe$_3$O$_4$ layers and 12 CoO layers As a result of measurement of the multilayered film by X-ray diffractometry, it was found that the ratio $[S_{(400)}/S_{(311)}]$ of the peak area of the plane (400) and the peak area of the plane (311) was 8, and that the plane (400) was substantially oriented in parallel with the surface of the substrate.

The multilayered film was annealed in the air at 330° C. for 2 hours so as to produce a Co-containing $\gamma$-Fe$_2$O$_3$ film having an NiO film as an primary layer.

As a result of the X-ray diffraction of the Co-containing $\gamma$-Fe$_2$O$_3$ film obtained, it was found that the ratio $[S_{(400)}/S_{(311)}]$ of the peak area of the plane (400) and the peak area of the plane (311) was 5, that the plane (400) was substantially oriented in parallel with the surface of the substrate, and that the spacing of the plane (400) was 2.075 Å. As a result of observation of the magnetization curve of the Co-containing $\gamma$-Fe$_2$O$_3$ film, it was recognized as a perpendicular magnetic film. As to the magnetic characteristics of the perpendicular magnetic film, the saturation magnetization was 340 emu/cm$^3$, the coercive force was 1150 Oe, the squareness was 0.37 (the value compensated by a demagnetization coefficient was 0.92), and the perpendicular anisotropic magnetic field was 5200 Oe. Thus, the Co-containing $\gamma$-Fe$_2$O$_3$ film proved to be a favorable perpendicular magnetic film.

EXAMPLE 2

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 2000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 20, and that the plane (200) was substantially oriented in parallel with the surface of the substrate.

Thereafter, a spinel Fe$_3$O$_4$ film having a thickness of 400 Å and a NaCl-type CoO film having a thickness of 8 Å (the molar ratio of Co to Fe was 0.03) were formed on the primary layer at 200° C. as one unit of a multilayered film. That is, the thickness of one unit was 408 Å. These operations were alternately repeated 12 times to obtain a laminated film composed of 6 Fe$_3$O$_4$ layers and 6 CoO layers.

As a result of measurement of the multilayered film by X-ray diffractometry, it was found that the ratio $[S_{(400)}/S_{(311)}]$ of the peak area of the plane (400) and the peak area of the plane (311) was 8, and that the plane (400) was substantially oriented in parallel with the surface of the substrate.

The multilayered film was annealed in the air at 330° C. for 2 hours so as to produce a Co-containing $\gamma$-Fe$_2$O$_3$ film having a NiO film as a primary layer.

As a result of the X-ray diffraction of the Co-containing $\gamma$-Fe$_2$O$_3$ film obtained, it was found that the ratio $[S_{(400)}/S_{(311)}]$ of the peak area of the plane (400) and the peak area of the plane (311) was 5, that the plane (400) was substantially oriented in parallel with the surface of the substrate, and that the spacing of the plane (400) was 2.072 Å. as a result of observation of the magnetization curve of the Co-containing $\gamma$-Fe$_2$O$_3$ film, it was recognized as a perpendicular magnetic film. As to the magnetic characteristics of the perpendicular magnetic film, the saturation magnetization was 335 emu/cm$^3$, the coercive force was 2000 Oe, the squareness was 0.65 (the value compensated by a demagnetization coefficient was 0.93), and the perpendicular anisotropic magnetic field was 7800 Oe. Thus, the Co-containing $\gamma$-Fe$_2$O$_3$ film proved to be a favorable perpendicular magnetic film.

EXAMPLE 3

In a high-frequency high-rate sputtering device SH-250H-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 2000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 10, and that the plane (200) was substantially oriented in parallel with the surface of the substrate in the NiO film.

Thereafter, a spinel Fe$_3$O$_4$ film having a thickness of 300 Å and a NaCl-type CoO film having a thickness of 14 Å (the molar ratio of Co to Fe was 0.07) were formed on the primary layer at 200° C. as one unit of a multilayered film.

That is, the thickness of one unit was 314 Å. These operations were alternately repeated 8 times to obtain a laminated film composed of 4 Fe$_3$O$_4$ layers and 4 CoO layers.

As a result of measurement of the multilayered film by X-ray diffractometry, it was found that the ratio $[S_{(400)}/S_{(311)}]$ of the peak area of the plane (400) and the peak area of the plane (311) was 14, and that the plane (400) was substantially oriented in parallel with the surface of the substrate.

The multilayered film was annealed in the air at 350° C. for 2 hours so as to produce a Co-containing $\gamma$-$Fe_2O_3$ film having a NiO film as a primary layer.

As a result of the X-ray diffraction of the Co-containing $\gamma$-$Fe_2O_3$ film obtained, it was found that the ratio $[S_{(400)}/S_{(311)}]$ of the peak area of the plane (400) and the peak area of the plane (311) was 10, that the plane (400) was substantially oriented in parallel with the surface of the substrate, and that the spacing of the plane (400) was 2.082 Å. As a result of observation of the magnetization curve of the Co-containing $\gamma$-$Fe_2O_3$ film, it was recognized as a perpendicular magnetic film. As to the magnetic characteristics of the perpendicular magnetic film, the saturation magnetization was 325 emu/cm$^3$, the coercive force was 2900 Oe, the squareness was 0.80 (the value compensated by a demagnetization coefficient was 0.94), and the perpendicular anisotropic magnetic field was 10000 Oe. Thus, the Co-containing $\gamma$-$Fe_2O_3$ film proved to be a favorable perpendicular magnetic film.

EXAMPLE 4

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 10, and that the plane (200) was substantially oriented in parallel with the surface of the substrate.

Thereafter, a spinel $Fe_3O_4$ film having a thickness of 260 Å and an oxide film containing Co and Mn (the molar ratio of Mn to Co was 0.24) having a thickness of 4 Å (the molar ratio of Co to Fe was 0.02) were formed on the primary layer at 200° C. as one unit of a multilayered film. That is, the thickness of one unit was 264 Å, and the molar ratio of Co to Fe was 0.02. These operations were alternately repeated 20 times to obtain a laminated film composed of 10 $Fe_3O_4$ layers each having a thickness of 260 Å and 10 oxide layers containing Co and Mn each having a thickness of 4 Å.

As a result of measurement of the multilayered film by X-ray diffractometry, it was found that the ratio $[S_{(400)}/S_{(311)}]$ of the peak area of the plane (400) and the peak area of the plane (311) was 6, and that the plane (400) was substantially oriented in parallel with the surface of the substrate.

The multilayered film was annealed in the air at 350° C. for 1 hour so as to produce a Co- and Mn-containing $\gamma$-$Fe_2O_3$ film having a NiO film as a primary layer.

As a result of the X-ray diffraction of the Co- and Mn-containing $\gamma$-$Fe_2O_3$ film obtained, it was found that the ratio $[S_{(400)}/S_{(311)}]$ of the peak area of the plane (400) and the peak area of the plane (311) was 4, that the plane (400) was substantially oriented in parallel with the surface of the substrate, and that the spacing of the plane (400) was 2.072 Å. As a result of observation of the magnetization curve of the Co- and Mn-containing $\gamma$-$Fe_2O_3$ film, it was recognized as a perpendicular magnetic film. As to the magnetic characteristics of the perpendicular magnetic film, the saturation magnetization was 330 emu/cm$^3$, the coercive force was 1450 Oe, the squareness was 0.47 (the value compensated by a demagnetization coefficient was 0.95), and the perpendicular anisotropic magnetic field was 6200 Oe. Thus, the Co- and Mn-containing $\gamma$-$Fe_2O_3$ film proved to be a favorable perpendicular magnetic film.

EXAMPLE 5

In a high-frequency high-rate sputtering device SH-250H-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 4, and that the plane (200) was substantially oriented in parallel with the surface of the substrate.

Thereafter, a spinel $Fe_3O_4$ film having a thickness of 300 Å and an oxide film containing Co and Mn (the molar ratio of Mn to Co was 0.10) having a thickness of 4 Å (the molar ratio of Co to Fe was 0.02) were formed on the primary layer at 200° C. as one unit of a multilayered film. That is, the thickness of one unit was 304 Å, and the molar ratio of Co to Fe was 0.02. These operations were alternately repeated 20 times to obtain a laminated film composed of 10 $Fe_3O_4$ layers each having a thickness of 300 Å and 10 oxide layers containing Co and Mn each having a thickness of 4 Å.

As a result of measurement of the multilayered film by X-ray diffractometry, it was found that the ratio $[S_{(400)}/S_{(311)}]$ of the peak area of the plane (400) and the peak area of the plane (311) was 9, and that the plane (400) was substantially oriented in parallel with the surface of the substrate.

The multilayered film was annealed in the air at 350° C. for 1 hour so as to produce a Co- and Mn-containing $\gamma$-$Fe_2O_3$ film having an NiO film as a primary layer.

As a result of the X-ray diffraction of the Co- and Mn-containing $\gamma$-$Fe_2O_3$ film obtained, it was found that the ratio $[S_{(400)}/S_{(311)}]$ of the peak area of the plane (400) and the peak area of the plane (311) was 7, that the plane (400) was substantially oriented in parallel with the surface of the substrate, and that the spacing or the plane (400) was 2.069 Å. As a result of observation of the magnetization curve of the Co- and Mn-containing $\gamma$-$Fe_2O_3$ film, it was recognized as a perpendicular magnetic film. As to the magnetic characteristics of the perpendicular magnetic film, the saturation magnetization was 335 emu/cm$^3$, the coercive force was 1500 Oe, the squareness was 0.49 (the value compensated by a demagnetization coefficient was 0.96), and the perpendicular anisotropic magnetic field was 6100 Oe. Thus, the Co-containing $\gamma$-$Fe_2O_3$ film proved to be a favorable perpendicular magnetic film.

Reference Example 1

In a high-frequency high-rate sputtering device SH-250H-T06 (manufactured by Ulvac Corp.), a glass substrate was placed with a distance of 80 mm from an Fe target and the substrate temperature was held at 200° C. Reactive sputtering was first carried out by using the Fe target in an atmosphere of argon and oxygen under an oxygen partial pressure of 0.11 mTorr and the total pressure of 5 mTorr at a deposition rate of 40 Å/min, thereby forming a spinel $Fe_3O_4$ layer on the glass substrate to a thickness of 62 Å as a first layer.

The shutter was next rotated to form a NaCl-type CoO film to a thickness of 4 Å as a second layer by sputtering the Co target at a deposition rate of 42 Å/min.

The first layer and the second layer constituted one unit having a thickness of 66 Å. The molar ratio of Co to Fe in the unit was 0.09. These operations were alternately repeated 100 tines to obtain a laminated film composed of 50 $Fe_3O_4$ layers and 50 CoO layers.

As a result of measurement of the multilayered film by X-ray diffractometry, it was found that the ratio $[S_{(400)}/S_{(311)}]$ of the peak area of the plane (400) and the peak area of the plane (311) was 5, that the plane (400) was substantially oriented in parallel with the surface of the substrate.

The multilayered film obtained was annealed in the air at 350° C. for 2 hours so as to produce a Co-containing $\gamma$-$Fe_2O_3$ film.

As a result of measurement of the Co-containing $\gamma$-$Fe_2O_3$ film obtained by X-ray diffractometry, it was found that the plane (400) was substantially oriented in parallel with the surface of the substrate and that the spacing of the plane (400) was 2.077 Å. When the magnetization curve of the Co-containing $\gamma$-$Fe_2O_3$ film was observed, it was recognized as a perpendicular magnetic film. With respect to the magnetic characteristics of the perpendicular magnetic film, the saturation magnetization was 340 emu/cm$^3$, the coercive force was 5300 Oe, and the squareness was 0.81 (the value compensated by a demagnetization coefficient was 0.91). Thus, the Co-containing $\gamma$-$Fe_2O_3$ film proved to be a favorable perpendicular magnetic film.

Comparative Example 1

In a high-frequency high-rate sputtering device SH-250H-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 2000 Å as a primary layer.

As a result of measurement of the NiO film by X-ray diffractometry, it was found that the plane (200) was substantially oriented in parallel with the surface of the substrate.

A cobalt ferrite monolayer film was formed on the NiO film to a thickness of 0.17 $\mu$m at a temperature of 400° C.

As a result of measurement of the cobalt ferrite film obtained by X-ray diffractometry, it was found that the plane (400) was substantially oriented in parallel with the surface of the substrate and that the spacing of the plane (400) was 2.106 Å. With respect to the magnetic characteristics of the cobalt ferrite film, the saturation magnetization was 260 emu/cm$^3$, the coercive force was 1500 Oe, the squareness was 0.30 (the value compensated by a demagnetization coefficient was 0.84), and the perpendicular anisotropic magnetic field was 4000 Oe.

EXAMPLE 6

In a high-frequency high-rate sputtering device SH-250-T06 (manufactured by Ulvac Carp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 6, and that the plane (200) was substantially oriented in parallel with the surface of the substrate.

Thereafter, a spinel $Fe_3O_4$ film having a thickness of 280 Å and an NaCl-type CoO film having a thickness of 4 Å (the molar ratio of Co to Fe was 0.023) were formed on the primary layer at 200° C. as one unit of a multilayered film. That is, the thickness of one unit was 284 Å. These operations were alternately repeated 6 times to obtain a laminated film composed of 3 $Fe_3O_4$ layers and 3 CoO layers.

As a result of measurement of the multilayered film by X-ray diffractometry, it was found that the ratio $[(S_{(400)}/S_{(311)}]$ of the peak area of the plane (400) and the peak area of the plane (311) was 4, and that the plane (400) was substantially oriented in parallel with the surface of the substrate.

The multilayered film was annealed in the air at 330° C. for 2 hours so as to produce a Co-containing $\gamma$-$Fe_2O_3$ film having a NiO film as a primary layer.

As a result of the X-ray diffraction of the Co-containing $\gamma$-$Fe_2O_3$ film obtained, it was found that the ratio $[S_{(400)}/S_{(311)}]$ of the peak area of the plane (400) and the peak area of the plane (311) was 3, that the plane (400) was substantially oriented in parallel with the surface of the substrate, and that the spacing of the plane (400) was 2.070 Å. As a result of observation of the magnetization curve of the Co-containing $\gamma$-$Fe_2O_3$ film, it was recognized as a perpendicular magnetic film. As to the magnetic characteristics of the perpendicular magnetic film, the saturation magnetization was 330 emu/cm$^3$, the coercive force was 2980 Oe, the squareness was 0.79 (the value compensated by a demagnetization coefficient was 0.90), and the perpendicular anisotropic magnetic field was 11000 Oe. Thus, the Co-containing $\gamma$-$Fe_2O_3$ film proved to be a favorable perpendicular magnetic film.

Comparative Example 2

In a high-frequency high-rate sputtering device SH-250H-T06 (manufactured by Ulvac Corp.), a glass substrate was placed with a distance of 80 mm from an Ni target, and reactive sputtering was carried out at a temperature of 120° C. by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having 1000 Å as a primary layer.

As a result of measurement of the NiO film by X-ray diffractometry, it was found that the ratio $[S_{(}200)/S_{(111)}]$ of the peak area of the plane (200) and the peak area of the plane (111) was 1.

Thereafter, a spinel $Fe_3O_4$ film having a thickness of 158 Å and a NaCl-type CoO film having a thickness of 2 Å (the molar ratio of Co to Fe was 0.02) were formed on the primary layer at 200° C. as one unit of a multilayered film. That is, the thickness of one unit was 160 Å. These operations were alternately repeated 16 times to obtain a laminated film composed of 8 $Fe_3O_4$ layers and 8 CoO layers.

As a result of measurement of the multilayered film by X-ray diffractometry, it was found that the ratio $[S_{(400)}/S_{(311)}]$ of the peak area of the plane (400) and the peak area of the plane (311) was 1.5.

As a result of the X-ray diffraction of the Co-containing $\gamma$-Fe$_2$O$_3$ film obtained, it was found that the ratio $[S_{(400)}/S_{(311)}]$ of the peak area of the plane (400) and the peak area of the plane (311) was 1, and that the spacing of the plane (400) was 2.075 Å. When the magnetization curve of the Co-containing $\gamma$-Fe$_2$O$_3$ film, both the coercive force and the residual magnetization were larger in the plane, so that it was not recognized as a perpendicular magnetic film.

Comparative Example 3

In a high-frequency high-rate sputtering device SH-250H-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.10 mTorr and the total pressure of 5 mTorr at a deposition rate of 40 Å/min, thereby forming a NaCl-type NiO film having a thickness of 1000 Å as a primary layer.

As a result of measurement of the NiO file by X-ray diffractometry, it was found that the ratio $[S_{(200)}/S_{(111)}]$ of the peak area of the plane (200) and the peak area of the plane (111) was 8, and that the plane (200) was substantially oriented in parallel with the surface of the substrate.

Thereafter, a spinel Fe$_3$O$_4$ film having a thickness of 240 Å and a NaCl-type CoO film having a thickness of 2 Å (the molar ratio of Co to Fe was 0.015) were formed on the primary layer at 200° C. as one unit of a multilayered film. That is, the thickness of one unit was 242 Å. These operations were alternately repeated 10 times to obtain a laminated film composed of 5 Fe$_3$O$_4$ layers and 5 CoO layers.

The multilayered film was annealed in the air at 330° C. for 2 hours so as to produce a Co-containing $\gamma$-Fe$_2$O$_3$ film having a NiO film as a primary layer.

As a result of the X-ray diffraction of the Co-containing $\gamma$-Fe$_2$O$_3$ film obtained, it was found that the ratio $[S_{(400)}/S_{(311)}]$ of the peak area of the plane (400) and the peak area of the plane (311) was 5, that the plane (400) was substantially oriented in parallel with the surface of the substrate, and that the spacing of the plane (400) was 2.064 Å. As a result of observation of the magnetization curve of the Co-containing $\gamma$-Fe$_2$O$_3$ film, it was recognized as a perpendicular magnetic film. As to the magnetic characteristics of the perpendicular magnetic film, the saturation magnetization was 330 emu/cm$^3$, the coercive force was 3300 Oe, the squareness was 0.82 (the value compensated by a demagnetization coefficient was 0.92), and the perpendicular anisotropic magnetic field was 11000 Oe.

EXAMPLE 7

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 20, and that the plane (200) was substantially oriented in parallel with the surface of the substrate.

Thereafter, a spinel Fe$_3$O$_4$ film having a thickness of 300 Å and a NaCl-type CoO film having a thickness of 4 Å (the molar ratio of Co to Fe was 0.02) were formed on the primary layer at 200° C. as one unit of a multilayered film. That is, the thickness of one unit was 304 Å. These operations were alternately repeated 8 times to obtain a laminated film composed of 4 Fe$_3$O$_4$ layers and 4 CoO layers.

As a result of measurement of the multilayered film by X-ray diffractometry, it was found that the peak area of the plane (400) was appeared only, but the peak area of the plane (311) was not appeared, i.e., was zero, and that the plane (400) was substantially oriented in parallel with the surface of the substrate.

The multilayered film was annealed in the air at 300° C. for 2 hours so as to produce a Co-containing $\gamma$-Fe$_2$O$_3$ film having a NiO film as a primary layer.

As a result of the X-ray diffraction of the Co-containing $\gamma$-Fe$_2$O$_3$ film obtained, it was found that the peak area of the plane (400) was appeared only, but the peak area of the plane (311) was not appeared, that the plane (400) was substantially oriented in parallel with the surface of the substrate, and that the spacing of the plane (400) was 2.072 Å. As a result of observation of the magnetization curve of the Co-containing $\gamma$-Fe$_2$O$_3$ film, it was recognized as a perpendicular magnetic film. As to the magnetic characteristics of the perpendicular magnetic film, the saturation magnetization was 330 emu/cm$^3$, the coercive force was 1700 Oe, the squareness was 0.56 (the value compensated by a demagnetization coefficient was 0.95), and the perpendicular anisotropic magnetic field was 7000 Oe. Thus, the Co-containing $\gamma$-Fe$_2$O$_3$ film proved to be a favorable perpendicular magnetic film.

EXAMPLE 8

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the peak area of the plane (200) was appeared only, but the peak area of the plane (111) was not appeared, and that the plane (200) was substantially oriented in parallel with the surface of the substrate.

Thereafter, a spinel Fe$_3$O$_4$ film having a thickness of 1300 Å and a NaCl-type CoO film having a thickness of 16 Å (the molar ratio of Co to Fe was 0.018) were formed on the primary layer at 200° C. as one unit of a multilayered film. That is, the thickness of one unit was 1316 Å. These operations were alternately repeated 2 times to obtain a laminated film composed of one Fe$_3$O$_4$ layers and one CoO layers.

As a result of measurement of the multilayered film by X-ray diffractometry, it was found that the ratio $[S_{(400)}/S_{(311)}]$ of the peak area of the plane (400) and the peak area of the plane (311) was 9, and that the plane (400) was substantially oriented in parallel with the surface of the substrate.

The multilayered film was annealed in the air at 330° C. for 2 hours so as to produce a Co-containing $\gamma$-Fe$_2$O$_3$ film having a NiO film as a primary layer.

As a result of the X-ray diffraction of the Co-containing γ-Fe$_2$O$_3$ film obtained, it was found that the ratio [S$_{(400)}$/S$_{(311)}$] of the peak area of the plane (400) and the peak area of the plane (311) was 6, that the plane (400) was substantially oriented in parallel with the surface of the substrate, and that the spacing of the plane (400) was 2.072 Å. As a result of observation of the magnetization curve of the Co-containing γ-Fe$_2$O$_3$ film, it was recognized as a perpendicular magnetic film. As to the magnetic characteristics of the perpendicular magnetic film, the saturation magnetization was 330 emu/cm$^3$, the coercive force was 1620 Oe, the squareness was 0.55 (the value compensated by a demagnetization coefficient was 0.92), and the perpendicular anisotropic magnetic field was 6800 Oe. Thus, the Co-containing γ-Fe$_2$O$_3$ film proved to be a favorable perpendicular magnetic film.

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl type NiO film having a thickness of 1000 Å as a primary layer.

As a result of measurement of the NiO film by X-ray diffractometry, it was found that the ratio [S$_{(200)}$/S$_{(111)}$] of the peak area of the plane (200) and the peak area of the plane (111) was 40, and that the plane (200) was substantially oriented in parallel with the surface of the substrate.

Thereafter, a spinel Fe$_3$O$_4$ film having a thickness of 80 Å and a NaCl-type CoO film having a thickness of 1 Å (the molar ratio of Co to Fe was 0.02) were formed on the primary layer at 200° C. as one unit of a multilayered film. That is, the thickness of one unit was 81 Å. These operations were alternately repeated 20 times to obtain a laminated film composed of 10 Fe$_3$O$_4$ layers and 10 CoO layers.

As a result of measurement of the multilayered film by X-ray diffractometry, it was found that the ratio [S$_{(400)}$/S$_{(311)}$] of the peak area of the plane (400) and the peak area of the plane (311) was 10, and that the plane (400) was substantially oriented in parallel with the surface of the substrate.

The multilayered film was annealed in the air at 240° C. for 3 hours so as to produce a Co-containing γ-Fe$_2$O$_3$ film having a NiO film as an primary layer.

As a result of the X-ray diffraction of the Co-containing γ-Fe$_2$O$_3$ film obtained, it was found that the ratio [S$_{(400)}$/S$_{(311)}$] of the peak area of the plane (400) and the peak area or the plane (311) was 8, that the plane (400) was substantially oriented in parallel with the surface of the substrate, and that the spacing of the plane (400) was 2.072 Å. As a result of observation of the magnetization curve of the Co-containing γ-Fe$_2$O$_3$ film, it was recognized as a perpendicular magnetic film. As to the magnetic characteristics of the perpendicular magnetic film, the saturation magnetization was 330 emu/cm$^3$, the coercive force was 1620 Oe, the squareness was 0.51 (the value compensated by a demagnetization coefficient was 0.90), and the perpendicular anisotropic magnetic field was 6000 Oe. Thus, the Co-containing γ-Fe$_2$O$_3$ film proved to be a favorable perpendicular magnetic film.

EXAMPLE 10

In a high-frequency high-rate sputtering device SH-250-T06 (manufactured by Uivac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio [S$_{(200)}$/S$_{(111)}$] of the peak area of the plane (200) and the peak area of the plane (111) was 10, and that the plane (200) was substantially oriented in parallel with the surface of the substrate.

Thereafter, the sputtering was carried out at a temperature of 200° C. by using Fe-Co alloy target in an atmosphere of argon and oxygen under an oxygen partial pressure of 0.10 mTorr and the total pressure of 5 mTorr at a deposition rate of 40 Å/min, thereby forming a Co-containing Fe$_3$O$_4$ mono-layered film (the molar ratio of Co to Fe was 0.020) having a thickness of 1000 Å on the NiO primary layer.

As a result of measurement of the monolayered film by X-ray diffractometry, it was found that the ratio [S$_{(400)}$/S$_{(311)}$] of the peak area of the plane (400) and the peak area of the plane (311) was 3, and that the plane (400) was substantially oriented in parallel with the surface of the substrate.

The monolayered film was annealed in the air at 330° C. for 2 hours so as to produce a Co-containing γ-Fe$_2$O$_3$ film having a NiO film as a primary layer.

As a result of the X-ray diffraction of the Co-containing γ-Fe$_2$O$_3$ film obtained, it was found that the ratio [S$_{(400)}$/S$_{(311)}$] of the peak area of the plane (400) and the peak area of the plane (311) was 2.5, that the plane (400) was substantially oriented in parallel with the surface of the substrate, and that the spacing of the plane (400) was 2.072 Å. As a result of observation of the magnetization curve of the Co-containing γ-Fe$_2$O$_3$ film, it was recognized as a perpendicular magnetic film. As to the magnetic characteristics of the perpendicular magnetic film, the saturation magnetization was 300 emu/cm$^3$, the coercive force was 1700 Oe, the squareness was 0.55 (the value compensated by a demagnetization coefficient was 0.89), and the perpendicular anisotropic magnetic field was 7000 Oe. Thus, the Co-containing γ-Fe$_2$O$_3$ film proved to be a favorable perpendicular magnetic film.

Comparative Example 4

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio [S$_{(200)}$/S$_{(111)}$] of the peak area of the plane (200) and the peak area of the plane (111) was 6, and that the plane (200) was substantially oriented in parallel with the surface of the substrate.

Thereafter, a spinel Fe$_3$O$_4$ film having a thickness of 280 Å and an NaCl-type CoO film having a thickness of 20 Å (the molar ratio of Co to Fe was 0.107) were formed on the primary layer at 200° C. as one unit of a multilayered film. That is, the thickness of one unit was 300 Å. These operations were alternately repeated 6 times to obtain a laminated film composed of 3 Fe$_3$O$_4$ layers and 3 CoO layers.

As a result of measurement of the multilayered film by X-ray diffractometry, it was found that the ratio $[S_{(400)}/S_{(311)}]$ of the peak area of the plane (400). and the peak area of the plane (311) was 4, and that the plane (400) was substantially oriented in parallel with the surface of the substrate.

The multilayered film was annealed in the air at 330° C. for 2 hours so as to produce a Co-containing γ-Fe$_2$O$_3$ film having a NiO film as a primary layer.

As a result of the X-ray diffraction of the Co-containing γ-Fe$_2$O$_3$ film obtained, it was found that the ratio $[S_{(400)}/S_{(311)}]$ of the peak area of the plane (400) and the peak area of the plane (311) was 3, that the plane (400) was substantially oriented in parallel with the surface of the substrate, and that the spacing of the plane (400) was 2.078 Å. As a result of observation of the magnetization curve of the Co-containing γ-Fe$_2$O$_3$ film, it was recognized as a perpendicular magnetic film. As to the magnetic characteristics of the perpendicular magnetic film, the saturation magnetization was 330 emu/cm$^3$, the coercive force was 4600 Oe, the squareness was 0.86 (the value compensated by a demagnetization coefficient was 0.94), and the perpendicular anisotropic magnetic field was 18000 Oe. Thus, the Co-containing γ-Fe$_2$O$_3$ film proved to be a favorable perpendicular magnetic film.

Comparative Example 5

In a high-frequency high-rate sputtering device SH-250-T06 (manufactured by Ulvac Corp.), a glass substrate was placed with a distance of 80 mm from a Ni target, and reactive sputtering was carried out at room temperature by using the Ni target in an atmosphere of argon and oxygen under an oxygen partial pressure of 0.11 mTorr and the total pressure of 5 mTorr at a deposition rate of 40 Å/min, thereby forming a NaCl-type NiO film having a thickness of 1000 Å as a primary layer.

As a result of measurement of the NiO film by X-ray diffractometry, it was found that the ratio $[S_{(200)}/S_{(111)}]$ of the peak area of the plane (200) and the peak area of the plane (111) was 20, and that the plane (200) was substantially oriented in parallel with the surface of the substrate.

Thereafter, a spinel Fe$_3$O$_4$ film having a thickness of 320 Å and a NaCl-type CoO film having a thickness of 2 Å (the molar ratio of Co to Fe was 0.009) were formed on the primary layer at 150° C. as one unit of a multilayered film. That is, the thickness of one unit was 322 Å. These operations were alternately repeated 8 times to obtain a laminated film composed of 4 Fe$_3$O$_4$ layers and 4 CoO layers.

As a result of measurement of the multilayered film by X-ray diffractometry, it was found that the peak area of the plane (400) was appeared only, but the peak area of the plane (311) was not, appeared, and that the plane (400) was substantially oriented in parallel with the surface of the substrate.

The multilayered film was annealed in the air at 300° C. for 2 hours so as to produce a Co-containing γ-Fe$_2$O$_3$ film having a NiO film as a primary layer.

As a result of the X-ray diffraction of the Co-containing γ-Fe$_2$O$_3$ film obtained, it was found that the peak area of the plane (400) was appeared only, but the peak area of the plane (311) was not appeared, that the plane (400) was substantially oriented in parallel with the surface of the substrate, and that the spacing of the plane (400) was 2.072 Å. As a result of observation of the magnetization curve of the Co-containing γ-Fe$_2$O$_3$ film, it was recognized as a perpendicular magnetic film. As to the magnetic characteristics of the perpendicular magnetic film, the saturation magnetization was 340 emu/cm$^3$, the coercive force was 1000 Oe, the squareness was 0.23 (the value compensated by a demagnetization coefficient was and the perpendicular anisotropic magnetic field was 3000 Oe.

What is claimed is:

1. A process for producing a magnetic recording medium comprising a substrate, an NiO primary layer formed on the substrate, in which the plane (200) is substantially oriented in parallel with the surface of the substrate, and a Co-containing maghemite thin film formed on the NiO primary layer, in which the plane (400) is substantially oriented in parallel with the surface of the substrate, the molar ratio of Co to Fe is not less than 0.01:1 to less than 0.10:1, and the spacing of the plane (400) is not more than 2.082 Å; and having the coercive force of less than 3000 Oe, which process comprises the steps of:

(a) forming, on a substrate, a NiO primary layer in which the plane (200) is substantially oriented in parallel with the surface of the substrate;

(b) forming a monolayered Co-containing magnetite film or a multilayered film composed of at least one unit on the NiO primary layer, one unit being a laminate of a magnetite layer and a CoO layer, in which the plane (400) is substantially oriented in parallel with the surface of the substrate, and the molar ratio of Co to Fe is not less than 0.01:1 and less than 0.10:1; and (c) annealing the monolayered film or multilayered film in a temperature range of 240° to 450° C.

2. A process for producing a magnetic recording medium comprising a substrate, an NiO primary layer formed on the substrate, in which the plane (200) is substantially oriented in parallel with the surface of the substrate, and a Co-containing maghemite thin film formed on the NiO primary layer, in which the plane (400) is substantially oriented in parallel with the surface of the substrate, the molar ratio of Co to Fe is not less than 0.01:1 to less than 0.10:1, and the spacing of the plane (400) is not more than 2.082 Å; and having the coercive force of less than 3000 Oe, which process comprises the steps of:

(a) forming, on a substrate, a NiO primary layer in which the plane (200) is substantially oriented in parallel with the surface of the substrate;

(b) forming a monolayered Co- and Mn-containing magnetite film or a multilayered film composed of at least one unit on the NiO primary layer, one unit being a laminate of a magnetite layer and an oxide layer containing Co and Mn, in which the plane (400) is substantially oriented in parallel with the surface of the substrate, the molar ratio of Co to Fe is not less than 0.01:1 and less than 0.10:1 and the molar ratio of Mn to Co is 0.07:1 to 0.30:1; and (c) annealing the monolayered film or multilayered film in a temperature range of 240° to 450° C.

* * * * *